US011200312B1

(12) United States Patent
Greve et al.

(10) Patent No.: US 11,200,312 B1
(45) Date of Patent: Dec. 14, 2021

(54) DUAL LOCK STEP PROCESSOR SYSTEM

(71) Applicant: Rockwell Collins, Inc., Cedar Rapids, IA (US)

(72) Inventors: David A. Greve, Cedar Rapids, IA (US); James N. Potts, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 227 days.

(21) Appl. No.: 16/025,731

(22) Filed: Jul. 2, 2018

(51) Int. Cl.
*G06F 9/345* (2018.01)
*G06F 13/24* (2006.01)
*G06F 21/55* (2013.01)

(52) U.S. Cl.
CPC ............ *G06F 21/552* (2013.01); *G06F 9/345* (2013.01); *G06F 13/24* (2013.01); *G06F 2212/1052* (2013.01); *G06F 2221/034* (2013.01)

(58) Field of Classification Search
CPC ........ G06F 21/552; G06F 9/345; G06F 13/24; G06F 2212/1052; G06F 2221/034
See application file for complete search history.

(56) References Cited

U.S. PATENT DOCUMENTS

| 6,948,050 | B1* | 9/2005 | Gove | G06F 9/3851 |
| | | | | 712/35 |
| 7,821,919 | B2* | 10/2010 | Mizutani | G06F 13/4027 |
| | | | | 370/216 |
| 8,239,836 | B1 | 8/2012 | Franz et al. | |
| 8,369,451 | B2* | 2/2013 | Lakkis | H04J 13/0025 |
| | | | | 375/308 |
| 2007/0043972 | A1* | 2/2007 | Graham | G06F 11/1662 |
| | | | | 714/12 |
| 2020/0089559 | A1* | 3/2020 | Ainsworth | G06F 11/1629 |

* cited by examiner

*Primary Examiner* — Lynn D Feild
*Assistant Examiner* — Vladimir I Gavrilenko
(74) *Attorney, Agent, or Firm* — Suiter Swantz pc llo (57) ABSTRACT

A dual lock step processor system includes a first processor connected to a first memory, a second processor connected to a second memory, compiler engine, a first instruction engine operably connected to a first memory, and a second instruction engine operably connected to a second memory. The first instruction engine is configured to store a program value; encode the first program value using a first differential encoding and the compiler engine to generate a first encoded program value; and write the first encoded program value into a first address location of a plurality of first address locations. The second instruction engine is configured to store a program value; to encode the first program value using a second differential encoding and the compiler engine to generate a second encoded program value and write the second encoded program value into a second address location of a plurality of second address locations corresponding to the first selected address location.

9 Claims, 7 Drawing Sheets

DUAL LOCK STEP PROCESSOR SYSTEM

BACKGROUND

The present disclosure generally relates to critical embedded systems. More particularly, the present disclosure relates to systems and methods for safety of critical systems using dual lock step processor systems.

In existing security systems, software that runs on these systems is imperfect and has flaws in it. Accordingly, attackers are able to identify those flaws and then use them to manipulate the underlying implementation of that software on that platform, for example through arbitrary code execution and/or buffer overflow. Through manipulation an attacker may be able to write addresses for pieces of code that the attacker wants to have executed into that area, releasing control to the computer that will take those addresses and begin execution, thereby writing data off the end of that allocated area and into areas, like the stack frame, where sensitive information about how the program is supposed to execute is stored. Thus, an attacker may exploit vulnerabilities and install payload(s) into the system enabling the attacker to control the system and enable pivoting of critical data. The traditional vulnerability discovery-patch-update loop is too slow and expensive to provide effective cyber defense for such systems.

SUMMARY

In one aspect, the inventive concepts disclosed herein are directed to a dual lock step processor system. The dual lock step processor system includes a first processor, a second processor, and an exploit monitor. The first processor is operably connected to a first memory. The first memory includes a plurality of first address locations. The first processor is configured to receive, from the first memory, a first instruction to store a first program value; encode the first program value using a first differential encoding to generate a first encoded program value; and write the first encoded program value into a first selected address location of the plurality of first address locations. A second processor is operably connected to a second memory. The second memory includes a plurality of second address locations, each second address location of the plurality of second address locations corresponding to an identical first address location of the plurality of first address locations. The second processor is configured to receive, from the second memory, a second instruction to store the first program value; encode the first program value using a second differential encoding to generate a second encoded program value; and write the second encoded program value into a second selected address location of the plurality of second address locations corresponding to the first selected address location. The first processor is further configured to receive, from the second memory and subsequent to writing the first encoded program value into the first selected address location, a third instruction to retrieve a first stored value stored in the first selected address location; retrieve the first stored value from the first selected address location; and decode the first stored value using the first differential encoding to generate a first decoded stored value. The second processor is further configured to receive, from the second memory and subsequent to writing the second encoded program value into the second selected address location, a fourth instruction to retrieve a second stored value stored in the second selected address location; and decode the second stored value using the second differential encoding to generate a second decoded stored value. The exploit monitor is operably connected to the first processor and the second processor. The exploit monitor is configured to compare the first decoded stored value to the second decoded stored value; and signal an issue responsive to the first decoded stored value being different from the second decoded stored value.

In a further aspect, the inventive concepts disclosed herein are directed to a method. The method includes receiving an input associated with a first program value; receiving a first instruction to store the first program value; encoding the first program value using a first differential encoding to generate a first encoded program value on a first processor; writing the first encoded program value into a first selected address location, the first selected address location being one of a plurality of first address locations of a first memory, the first processor operably connected to the first memory; receiving a second instruction to store the first program value; encoding the first program value using a second differential encoding to generate a second encoded program value on a second processor; and writing the second encoded program value into a second selected address location, the second selected address location being one of a plurality of second address locations of a second memory, the second selected address location in the plurality of second address locations corresponding to an analogous location as the first selected address location in the plurality of first address locations, the second processor operably connected to the second memory.

In a further aspect, the inventive concepts disclosed herein are directed to a dual lock step processor. The dual lock step processor includes a first instruction engine and a second instruction engine. The first instruction engine is operably to a first memory, the first memory comprising a plurality of first address locations. The first instruction engine is configured to receive, from the first memory, a first instruction to store a first program value; encode the first program value using a first differential encoding and the compiler engine to generate a first encoded program value; and write the first encoded program value into a first selected address location of the plurality of first address locations. The second instruction engine is operably connected to a second memory, the second memory comprising a plurality of second address locations, each second address location of the plurality of second address locations corresponding to an analogous first address location of the plurality of first address locations. The second instruction engine is configured to receive, from the second memory, a second instruction to store the first program value; encode the first program value using a second differential encoding and the compiler engine to generate a second encoded program value; and write the second encoded program value into a second selected address location of the plurality of second address locations corresponding to the first selected address location.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for using dual lock step processors (e.g., dual redundant processors executing in a lock-step configuration). The use of dual lock step processors described herein leverages redundancy to provide protection against implementation vulnerabilities, such as control flow hijacking, arbitrary code execution, and exploit attempts. The inventive concepts described herein can be utilized in various types of electronic avionics applications for airborne platforms (e.g., fixed wing aircraft, rotary wing aircraft), including but not limited to flight control and autopilot systems, navigation systems, flight display systems, communications systems, and radar systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a dual lock step processor system includes a first processor, a second processor, and an exploit monitor. The first processor is operably connected to a first memory. The first memory includes a plurality of first address locations. The first processor is configured to receive, from the first memory, a first instruction to store a first program value; encode the first program value using a first differential encoding to generate a first encoded program value; and write the first encoded program value into a first selected address location of the plurality of first address locations. A second processor is operably connected to a second memory. The second memory includes a plurality of second address locations, each second address location of the plurality of second address locations corresponding to an identical first address location of the plurality of first address locations. The second processor is configured to receive, from the second memory, a second instruction to store the first program value; encode the first program value using a second differential encoding to generate a second encoded program value; and write the second encoded program value into a second selected address location of the plurality of second address locations corresponding to the first selected address location. The first processor is further configured to receive, from the second memory and subsequent to writing the first encoded program value into the first selected address location, a third instruction to retrieve a first stored value stored in the first selected address location; retrieve the first stored value from the first selected address location; and decode the first stored value using the first differential encoding to generate a first decoded stored value. The second processor is further configured to receive, from the second memory and subsequent to writing the second encoded program value into the second selected address location, a fourth instruction to retrieve a second stored value stored in the second selected address location; and decode the second stored value using the second differential encoding to generate a second decoded stored value. The exploit monitor is operably connected to the first processor and the second processor. The exploit monitor is configured to compare the first decoded stored value to the second decoded stored value; and signal an issue responsive to the first decoded stored value being different from the second decoded stored value.

As used herein, the term "program value" refers to information used in the processing operations of the system, such as information that is critical to the correct operation of the system. For example, program values includes memory address location, stack frame pointers, function pointers, program counters, and other information related to the operation of the system. Accordingly, the use of these term exemplary types of program values is non-limiting and applicable to the implementation of the inventive concepts herein and a wide variety of electronic data maintained and operated on by the system, including data critical to the correct operation of the system.

The system can be integrated with an airborne platform or other platform as described herein. For example, the dual lock step processor system described herein can be associated with an avionics system of an airborne platform that controls one or more aircraft cockpit displays and/or manages electronic communications being critical and non-critical systems.

Systems manufactured in accordance with the inventive concepts disclosed herein can improve operation and efficiency of cyber security of avionics systems through a system that includes dual-redundant processors executing in a lock-step configuration, an exploit monitor (e.g., comparators) that detects program value mismatches, and a diversifying compiler that produces complimentary executable images that run side-by-side on the dual processors. This configuration is sufficient to detect and signal any cyber exploit that attempts to hijack program control or inject and execute arbitrary code, eliminating the most common and dangerous class of cyber vulnerabilities. Accordingly, the dual lock step processor system described herein alleviates the need for randomness or security through obscurity security techniques found in current cyber security systems. As discussed further herein, it will be appreciated that the inventive concepts disclosed herein can make such electronic vulnerabilities impossible to exploit while significantly reducing the computational burden of security measures, as the exploit protection does not require computationally intensive encryption to be successful.

Figure 1:
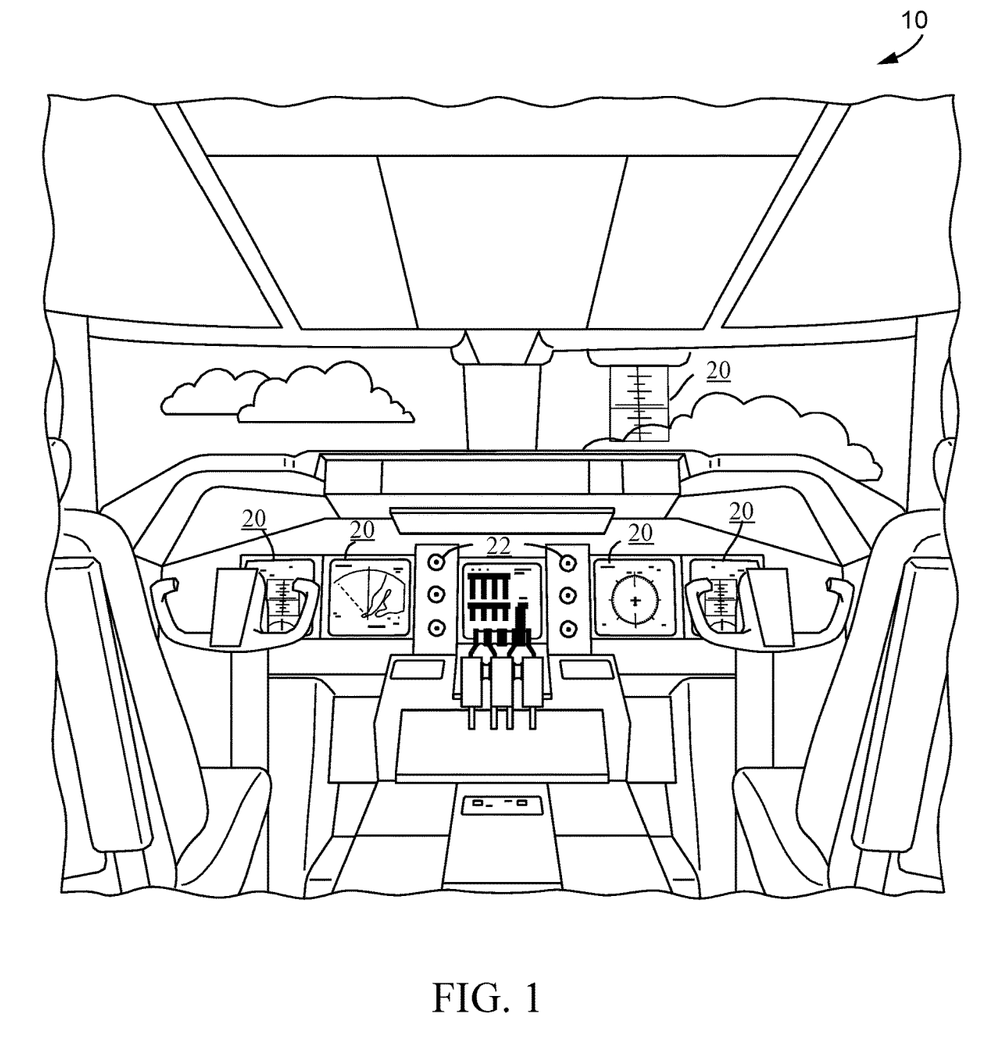
FIG. 1 is a schematic illustration of an exemplary embodiment of an aircraft control center according to the inventive concepts disclosed herein.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UP") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, HUDs with or without a projector, head up guidance systems, wearable displays, watches, Google Glass® or other HWD systems. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the UI elements 22 may be configured to interface with the systems and methods of the inventive concepts disclosed herein. Additionally, the flight displays 20 may be configured to receive output based on data received from a system external to an aircraft, such as a ground-based weather radar system, satellite-based system, a sensor system, or from a system of another aircraft that is protected from cyber attacks through the systems and methods of the inventive concepts disclosed herein.

In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three-dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization generated based on an indication of a runway surface condition and display the image information.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20 by way of systems and processes protected by one or more dual lock step processor systems. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft. As will be appreciated, systems that interface with a dual lock step processor system are protected against implementation vulnerabilities and from weaponization, delivery, and/or exploitation by an unauthorized entity.

Figure 2:
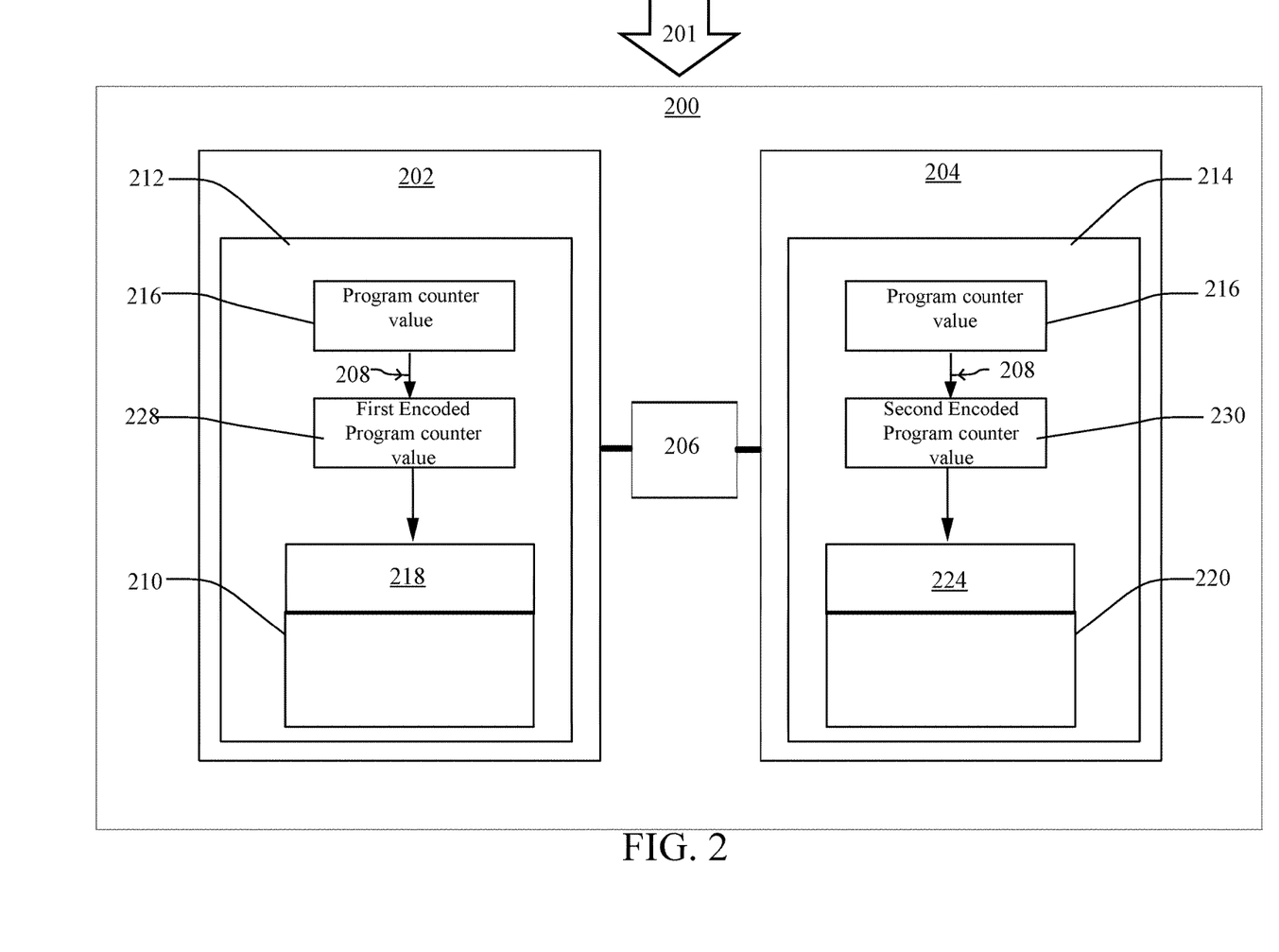
FIG. 2 is a block diagram of an exemplary embodiment of a dual lock step processor utilized in an aircraft electronic system according to the inventive concepts disclosed herein.

Referring now to FIG. 2, a dual lock step processor system 200 is shown according to an exemplary embodiment of the inventive concepts disclosed herein. The dual lock step processor system 200 includes a first processor 202, a second processor 204, and an exploit monitor 206 that is operably connected to the first processor 202 and the second processor 204. The first processor 202 and second processor 204 are separate processors that run-in lock step (e.g., at the same clock tick) and execute identical code. The first processor 202 and second processor 204 are configured to implement a differential encoding scheme for at least one program value stored in a pointer address of a memory subsystem. The dual lock step processor system 200 receives a single input 201 (e.g., instruction) that is passed through and executed by each processor. Thus, any code that is inserted or passed through to the dual lock step processor system 200 as the input 201 is executed on the first processor 202 and the second processor 204 in parallel and at the same time. As will be appreciated, due to the configuration of the dual lock step processor system 200 receiving a single input, an unauthorized entity (e.g., attacker, hacker, etc.) can only insert code that is the same, as it is impossible for different code to be inserted on different processors. Accordingly, write attacks against an avionics system implementing the dual lock step processor system 200 are prevented because of the implementation of differential encoding and single input, as the program that is loaded onto the computer is the only code that will be able to execute in that environment.

Each processor is communicably connected to a separate, independent memory subsystem. The first processor 202 is communicably connected to a first memory 212 and the second processor 204 is communicably connected to a second memory 214. While the first memory 212 is separate from the second memory 214, the first memory 212 and the second memory 214 are synchronized to execute identical code at the same clock tick. The first memory 212 and the second memory 214 include computer code or instruction modules for executing one or more processes described herein. In some embodiments, the executable memory of the first memory 212 and the second memory 214 are non-writable. As described herein, the first memory 212 includes a first memory stack 210 of a plurality of first address locations (e.g., stack pointer addresses) and the second memory 214 includes a second memory stack 220 of a plurality of second address locations. The plurality of first address locations of the first memory stack 210 is identical to the plurality of second address locations of the second memory stack 220. Accordingly, an unencoded program critical value will be identical in the same address location in the first memory stack 210 and the second memory stack 220.

The first processor 202 and second processor 204 may be implemented as a specific purpose processor, an application specific integrated circuit (ASIC), one or more field programmable gate arrays (FPGAs), a group of processing components, or other suitable electronic processing components. In some embodiments, each processor is a Zynq® UltraScale+™ MPSoC 64-bit processor. The first memory 212 or second memory 214 is one or more devices (e.g., RAM, ROM, flash memory, hard disk storage) for storing data and computer code for completing and facilitating the various user or client processes, layers, and modules described in the present disclosure. The first memory 212 or second memory 214 may be or include volatile memory or non-volatile memory and may include database components, object code components, script components, or any other type of information structure for supporting the various activities and information structures of the inventive concepts disclosed herein. The first memory 212 or second memory 214 can include various circuits, software engines, and/or modules that cause the processor to execute the systems and methods described herein. In some embodiments, the memory is a Zynq® UltraScale+™ MPSoC ARM core that loads Microblaze® RAM.

The first processor 202 and the second processor 204 include a compiler system 208 that is configured to execute encode and decode operations on each respective stack of the first memory 212 and the second memory 214. Generally, the compiler system 208 is configured to generate two different copies of software that are asymmetrically encoded, with one copy for each processor. The compiler system 208 is configured to encode one or more program counters when program counters are being written into memory. Conversely, the compiler system 208 is configured to decode one or more program counters when previously encoded program counters are being read from memory. As used herein, program counter refers to an instruction pointer (IP), instruction address register (TAR), the instruction counter, or a part of the instruction sequencer. While program counters are being used by way of example to illustrate the inventive concepts herein, as will be appreciated, a wide variety of program values may be substituted for the program counter in a similar implementation. The program counter is a processor register that indicates where a computer is in its program sequence. In most processors, the program counter is incremented after fetching an instruction, and holds the memory address of ("points to") the next instruction that would be executed or, in a processor where the incrementation precedes the fetch, the program counter points to the current instruction being executed. As will be appreciated, the program counter has a single value (e.g., program counter value) that is identical, when not encoded, in the first processor 202 and the second processor 204 and associated with the same memory address location for each respective processor. In some embodiments, only certain address locations in the first memory stack 210, and in the identical location in the second memory stack 220, have encoded program counter values. In other embodiments, each program counter value in each address location of the first memory stack 210 and the second memory stack 220 are encoded program counter values.

While the compiler system 208 is described as a software system on the dual lock step processor system 200 that adds artificial diversity by way of differential encoding, in some embodiments, the compiler system 208 is a dedicated hardware component with compiler software. In those embodiments, a compiler component would be operably connected to the first processor 202 and the second processor 204 and would be configured to receive the single instruction 201, encode the program counter value for each respective processor, and pass the encoded program value to the respective processor. Additionally, the compiler component would receive and decode a first encoded program counter value from the first processor 202 and receive and decode a related second encoded program counter value from the second processor 204. A compiler component would be beneficial in a dual lock step processor system 200 that implements differential encoding on all or substantially all of the stored program counters.

As used herein, the term "differential encoding" and/or "differential decoding" generally refers to the process by which the compiler system 208 manipulates one or more program counters in the first processor 202 in a way that is different from, and asymmetric to (e.g., not the same), the compiler system's 208 manipulation of the identical program counter in the second processor 204. In some embodiments, the differential encoding is dependent upon and associated with the address location associated with the manipulated (e.g., encoded or decoded) program counter. For example, the differential encoding may be an additive encoding of the program counter on the first processor 202 dependent upon the address location and a different encoding that includes subtracting the address location from the program counter in the second processor 204. In some embodiments, the differential encoding is applied prologue, that saves the return address on the stack before entering the function. In some embodiments, the differential encoding is applied epilogue that retrieves the return address from the stack after exiting the function. The differential encoding can be represented as any pair of functions $y_1=f(x)$, $y_2=g(x)$, where $y_1$ is a result of a first differential encoding applied for a program counter value stored in the first memory stack 210, $y_2$ is a result of a second differential encoding applied for a program counter value stored in the second memory stack 220, and $y_1$ is not equal to $y_2$ for all values of x, where x represents any value in the set of possible program counter values. As such, regardless of the external manipulation, such as a write attack, attempted on the dual lock step processor system 200, because $y_1$ is not equal to $y_2$ for any value of the program counter, the exploit can be detected and addressed accordingly. For example, the first differential encoding includes a summation encoding to generate the first encoded program value and a subtraction decoding to generate the first decoded stored value. The summation encoding is a sum of the first program value and the first selected address location and the subtraction decoding is a subtraction of the first program value and the first selected address location. The second differential encoding is a subtraction encoding to generate the second encoded program value and a summation decoding to generate the second decoded stored value. The subtraction encoding is a subtraction of the first program value and the second selected address location and the summation decoding is a summation of the first program value and the second selected address location.

The exploit monitor 206 is operably connected to the first processor 202 and the second processor 204 and is configured to monitor and compare program counters (e.g., program counter values, program counter traces, etc.). For example, the exploit monitor 206 may be configured to (1) constantly compare the program counters of the first processor 202 and the second processor 204, which allows the data (not the code) to be laid out differently in the first memory 212 and the second memory 214; (2) compare every address location used by the first processor 202 and the second processor 204 to fetch code, which allows the data (not the code) to be laid out differently in the first memory 212 and the second memory 214; and (3) compare the address location used by the first processor 202 and the second processor 204 to access each respective memory, which requires both data and code to be laid out in the first memory 212 and the second memory 214. The exploit monitor 206 will signal an issue (e.g., interrupt or stop execution of the dual lock step processor system 200) if the exploit monitor 206 detects a discrepancy between the executed code and/or program counter in the first processor 202 and the executed code and/or program counter of the second processor 204. For example, the exploit monitor 206 stops operation of the dual lock step processor system 200 when the decoded first encoded program value retrieved from a first address location in the first memory stack 210 does not match the decoded second encoded program value retrieved from an identical second address location in the second memory stack 220. In some embodiments, the exploit monitor 206 transmits an interrupt signal to each of the first processor 202 and the second processor 204 responsive to detecting the discrepancy, each interrupt signal configured to cause the respective first processor 202 and second processor 204 to interrupt or stop execution.

As shown in FIG. 2, the dual lock step processor system 200 receives an instruction 201 to store a program counter value. The first processor 202 receives a first instruction to store the program counter value 216 at a first address location 218 (e.g., a first selected address location) within the first memory stack 210. In parallel, the second processor 204 receives a second instruction to store the program counter value 216 at a second address location 224 (e.g., second selected address location) within the second memory stack 212. The second address location 224 is at an identical location in the second memory stack 220 as the first address location 218 in the first memory stack 210. The first instruction and the second instruction are identical because each processor executes identical code and each memory stores the same base (e.g., un-coded) program counter value 216. The compiler system 208 encodes the program counter value 216 on the first processor 202 using a first differential encoding to generate a first encoded program counter value 228. By way of example, the first differential encoding includes adding the first address location 218 to the base program counter value 216 such that the generated first encoded program counter value 228 is the summation of the first address location 218 and the base program counter value 216. In parallel, the compiler system 208 encodes the program counter value 216 on the second processor 204 using a second differential encoding to generate a second encoded program counter value 230. By way of example, the second differential encoding includes deducting the second address location 224 206 from the base program counter value 216 such that the generated second encoded program counter value 230 is the subtraction of the second address location 224 from the base program counter value 216. The first encoded program counter value 228 is written into the first address location 218 and the second encoded program counter value 230 is written into the second address location 224. This process is described in greater detail below.

Figure 3A:
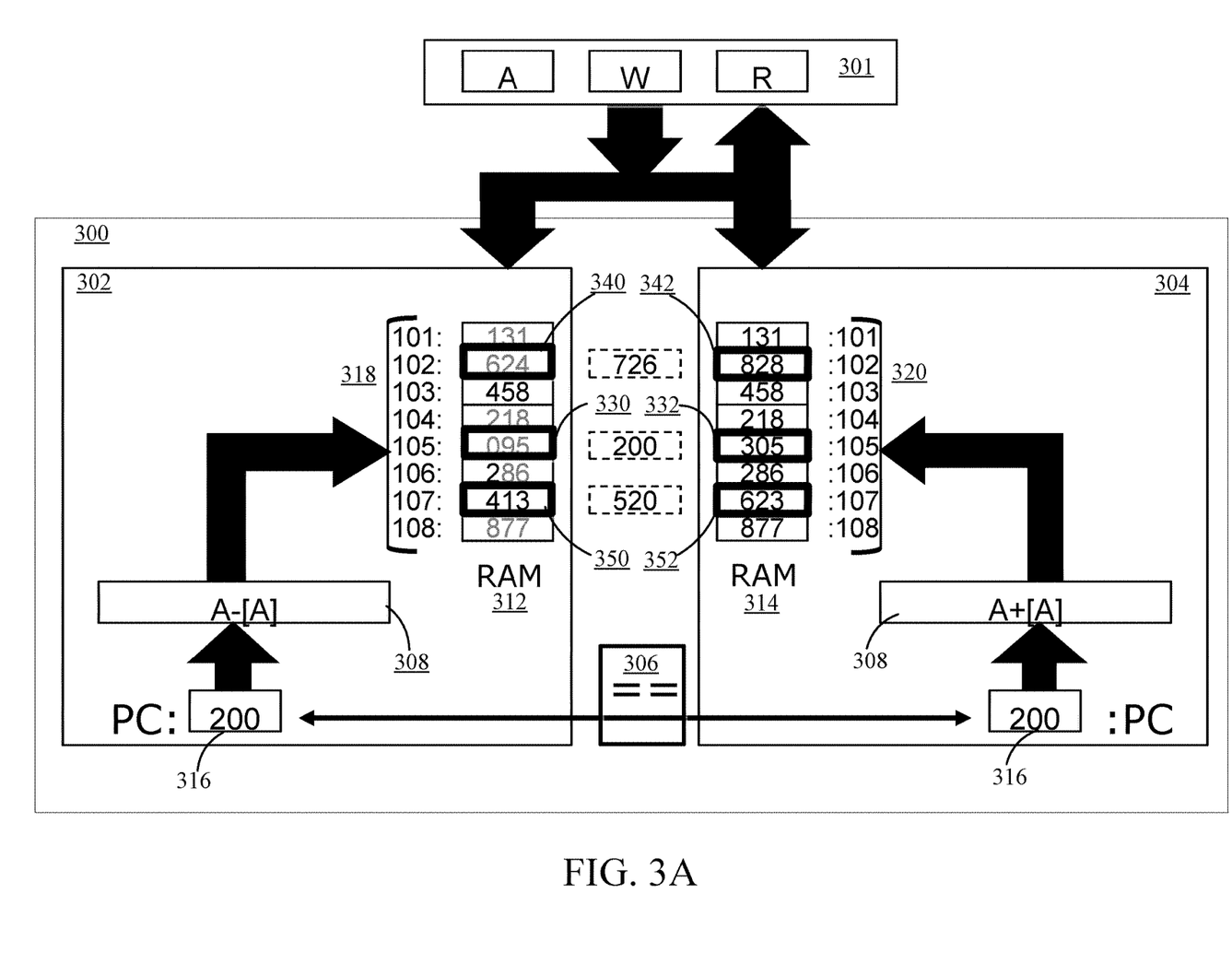
FIG. 3A is a schematic diagram of a dual lock step processor system executing a procedure call of saving program counters to memory according to the inventive concepts disclosed herein.

Turning to FIG. 3A, a schematic diagram of a dual lock step processor system 300 that is executing a procedure call of saving program counters to memory is shown according to the inventive concepts disclosed herein. The dual lock step processor system 300 is similar to the dual lock step processor system 200 of FIG. 2. The dual lock step processor system 300 includes a first processor 302, a second processor 304, and an exploit monitor 306 that is operably connected to the first processor 302 and the second processor 304. The first processor 302 and second processor 304 are separate processors that run-in lock step (e.g., at the same clock tick) and execute identical code. Each processor is communicably connected to a separate, independent memory subsystem. The first processor 302 is communicably connected to a first memory 312 and the second processor 304 is communicably connected to a second memory 314. The first memory 312 includes a first memory stack 318 of a plurality of first address locations (e.g., stack pointer addresses) and the second memory 314 includes a second memory stack 320 of a plurality of second address locations. The plurality of first address locations of the first memory stack 318 is identical to the plurality of second address locations of the second memory stack 320. The first processor 302 and the second processor 304 include a compiler system 308 that is configured to execute encode and decode operations on each respective stack of the first memory 312 and the second memory 314.

There is only one interface 301 between the dual lock step processor system 300 and the network (e.g., external world). The interface 301 provides the inputs to the dual lock step processor system 300 and is associated with the instruction. The interface 301 may include, for example, a keyboard or avionic instrument 22 from FIG. 1.

As shown in FIG. 3A, the first processor 302 and the second processor 304 have three memory stack address locations that are differentially encoded: (102), (105), and (107). As will be appreciated, any number of memory stack address locations may be differentially encoded as long as the encoding is done at the same memory stack address location in each respective processor. The current instruction is received from the input 301 and includes a write command to address location (105) and program counter value 316 of (200). A copy of the program counter value 316 of (200) is passed through to the first processor 302 and the second processor 304. The compiler system 308 on the first processor 302 manipulates the program counter value 316 by subtracting the address location of the first memory stack 318 to generate a first encoded program counter value 330. Specifically, the differential encoding executed by the compiler system 308 includes subtracting (105) from (200) to generate the first encoded program counter value 330 of (095). The first encoded program counter value 309 of (095) is written into the address location (105) indicated in the current instruction. In parallel, the compiler system 308 on the second processor 304 manipulates the program counter value 316 by subtracting the address location of the first memory stack 318 to generate a second encoded program counter value 332. Specifically, the differential encoding executed by the compiler system 308 includes adding (105) to (200) to generate the second encoded program counter value 332 of (305). The second encoded program counter value 332 of (305) is written into the address location (105) indicated in the current instruction.

During a write/encode instruction, the exploit monitor 306 is configured to monitor and check that the program counter 316 on the first processor 302 is identical to the program counter on the second processor 304 before the compiler system 308 manipulates the program counter on each respective processor. The exploit monitor 306 is configured to signal an issue if the program counter values are different. In other words, due to the single input, if a memory stack is overwritten during execution, the executing program in the first processor 302 will diverge from the executing program in the second processor 304 as any common value written in both stack will result in different return address (e.g., decoded program counter values) when the epilogues execute. In some embodiments, the exploit monitor is configured to monitor and compare that the same address location (e.g., (105) in the example above) for the current instruction.

When the current instruction is received from the input 301, it includes a write command of the program counter value of (726) to the address location (102). A copy of the program counter value of (726) is passed through to the first processor 302 and the second processor 304. The compiler system 308 on the first processor 302 manipulates the program counter value by subtracting the address location of the first memory stack 318 to generate a first encoded program counter value 340. Specifically, the differential encoding executed by the compiler system 308 includes subtracting (102) from (726) to generate the first encoded program counter value 340 of (624). The first encoded program counter value 309 of (624) is written into the address location (102) indicated in the current instruction. In parallel, the compiler system 308 on the second processor 304 manipulates the program counter value by subtracting the address location of the first memory stack 318 to generate a second encoded program counter value 342. Specifically, the differential encoding executed by the compiler system 308 includes adding (102) to (726) to generate the second encoded program counter value 342 of (828). The second encoded program counter value 342 of (828) is written into the address location (102) indicated in the current instruction. Similarly, a program counter value of (520) is stored in the first memory stack 318 at the address location (107) as a first encoded program value 350 as (413) and is stored in the second memory stack 320 at the address location (107) as a second encoded program value 352 as (623).

The first copy of the program counter value stored by the first processor 302 at the selected address location in the first memory 312 is identical to the second copy of the program counter value stored by the second processor 304 at the respective selected address location in the second memory 314 with the exception of the add or subtract instruction executed by the compiler system 308 in the prologue. The first processor 302 runs independent of, but synchronously with, the second processor 304. Accordingly, if no manipulation has occurred, running the program counter from first processor 302 and the second processor 304 will result in the same output.

Figure 3B:
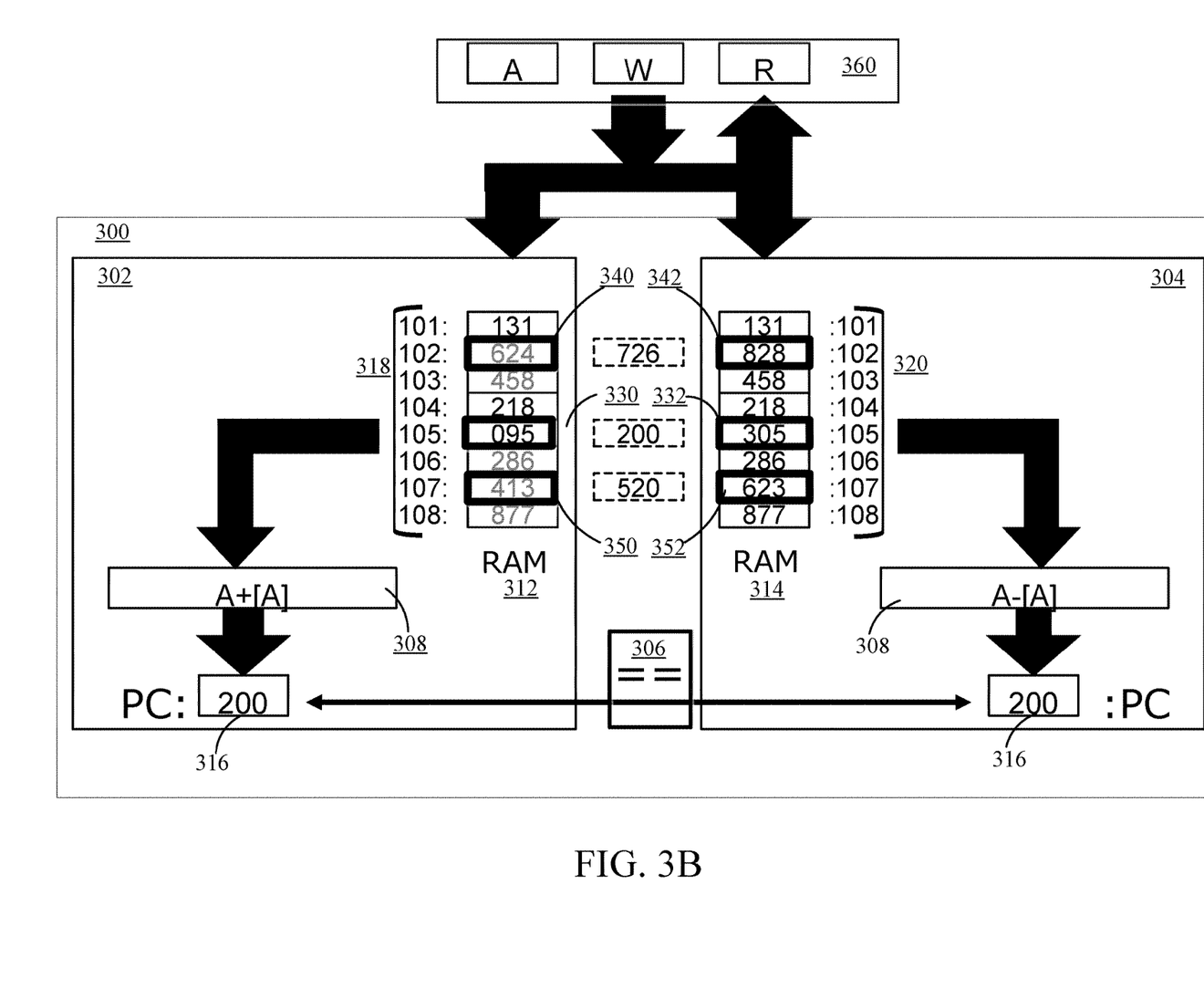
FIG. 3B is a schematic diagram of the dual lock step processor system of FIG. 3A executing a procedure call of retrieving program counters from memory according to the inventive concepts disclosed herein.

Referring now to FIG. 3B, a schematic diagram of the dual lock step processor system of FIG. 3A executing a procedure call of retrieving program counters from memory is shown, according to the inventive concepts disclosed herein. Subsequent to encoding and storing the program counter values, a decode instruction 360 is received to retrieve and decode the stored encoded program counter values. The decode instruction is received from the input 360 and includes a read command to address location (105) on the first processor 302 and the second processor 304. The previously stored first encoded program counter value 330 of (095) is retrieved from the address location (105) in the first memory stack 318 of the first memory 312 and the previously stored second encoded program counter value 332 of (305) is retrieved from the address location (105) in the second memory stack 320 of the second memory 314.

The first encoded program counter 330 is differentially decoded by the compiler system 308 to generate the program counter value 316 of (200). As will be appreciated, this manipulation is the opposite of the differential encoding done in FIG. 3A to generate the first encoded program counter 330. Specifically, the differential decoding executed by the compiler system 308 includes adding the address location (105) to the first encoded program counter 330 of (095) to generate the program counter 316 of (200). The second encoded program counter 332 is differentially decoded by the compiler system 308 to generate the program counter value 316 of (200). As will be appreciated, this manipulation is the opposite of the differential encoding done in FIG. 3A to generate the second encoded program counter 332. Specifically, the differential decoding executed by the compiler system 308 includes subtracting the address location (105) from the second encoded program counter 332 of (305) to generate the program counter 316 of (200).

During the decode instruction, the exploit monitor is configured to monitor and check that the decoded program counter 316 on the first processor 302 is identical to the decoded program counter 316 on the second processor 304 after the compiler system 308 manipulates (e.g., decodes) the program counter on each respective processor. In other words, due to the single input, if a memory stack is overwritten during execution, the executing program in the first processor 302 will diverge from the executing program in the second processor 304 as any common value written in both stack will result in different return address (e.g., decoded program counter values) when the epilogues execute. In some embodiments, the exploit monitor is configured to monitor and compare that the same address location (e.g., (105) in the example above) for the current instruction.

Figure 3C:
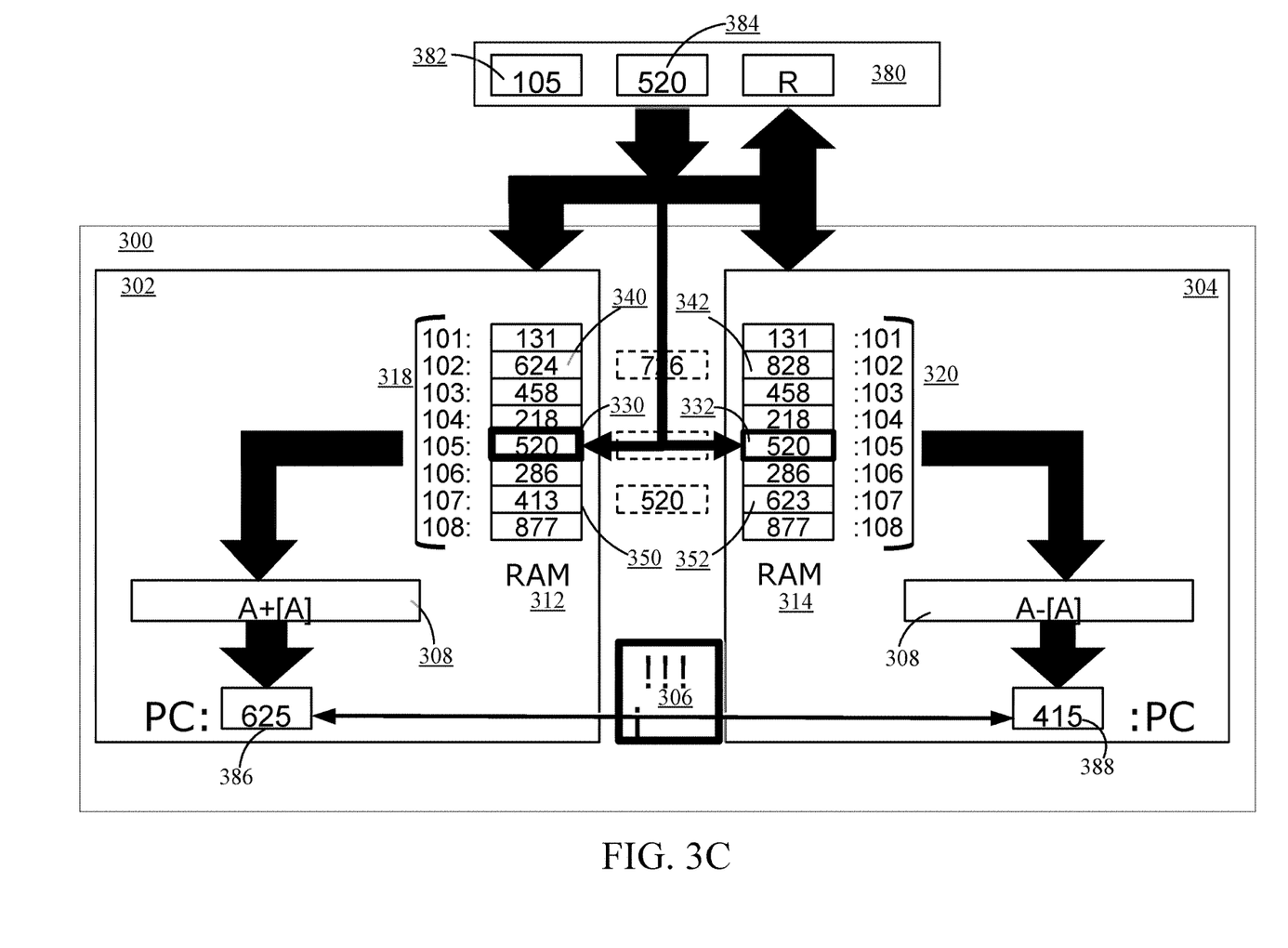
FIG. 3C is a schematic diagram of the dual lock step processor system of FIG. 3A executing a procedure call by an unauthorized entity to write a program counter according to the inventive concepts disclosed herein.

Referring now to FIG. 3C, a schematic diagram of the dual lock step processor system of FIG. 3A executing a procedure call by an unauthorized entity to read a program counter is shown, according to the inventive concepts disclosed herein. In this instance, an unauthorized entity has found a vulnerability in the operation system and is attempting to gain control over the code execution. Specifically, the unauthorized entity is pushing an unauthorized instruction 380 that includes a location parameter 382 of (105) and a program counter value 384 of (520) that is a "target value of interest." In other words, the unauthorized entity is loading a specific value of a program counter or a function pointer into the program counter register at a specific location 105. As previously stated, the dual lock step processor system 300 receives a single input which is passed to both processors. Thus, the program counter value 384 in the unauthorized instruction 380 is stored in the stack at the address (105) of the first memory 312 of the first processor 302 and the identical address (105) in the stack of the second memory 314 of the second processor 304.

When the memory is read out of the address that contains the unauthorized program counter value 384 of (520), which due to the single input is stored as (520) on both the first processor 302 and second processor 304, the address location (105) is identified as one that is differential encoded. Similar to the decoding process described above in connection to FIG. 3B, the unauthorized program counter value 384 of (520) is decoded by the compiler system 308 on the first processor 302 to generate a first decoded stored value 386. This is done by adding the address location (105) and the unauthorized program counter value (520) to generate the first decoded stored value 386 of (625). In parallel, the unauthorized program counter value 384 of (520) is decoded by the compiler system 308 on the second processor 304 to generate a second decoded stored value 388. This is done by subtracting the address location (105) from the unauthorized program counter value (520) to generate the second decoded stored value 388 of (625).

As shown in FIG. 3C, the exploit monitor 306 is triggered because the first decoded stored value 386 is not equal to the second decoded stored value 388 indicating a disruption in the control flow. The exploit monitor 306 interrupts the process and pauses the operation before fetching the next instruction from an address. While the unauthorized user attempted to gain control flow and gain control over the execution of the program, the differential encoding and single input of the dual lock step processor system 300 identified the insertion from an outside source. As will be appreciated, there is no way for the attacker to create different values in those locations, as any write information from the outside world will always show up the same in both memories and therefore will be treated differently by the two processors and trigger an interrupt when the decoding of the inserted values using differential decoding fails to generate identical program counters on both processors.

Figure 3D:
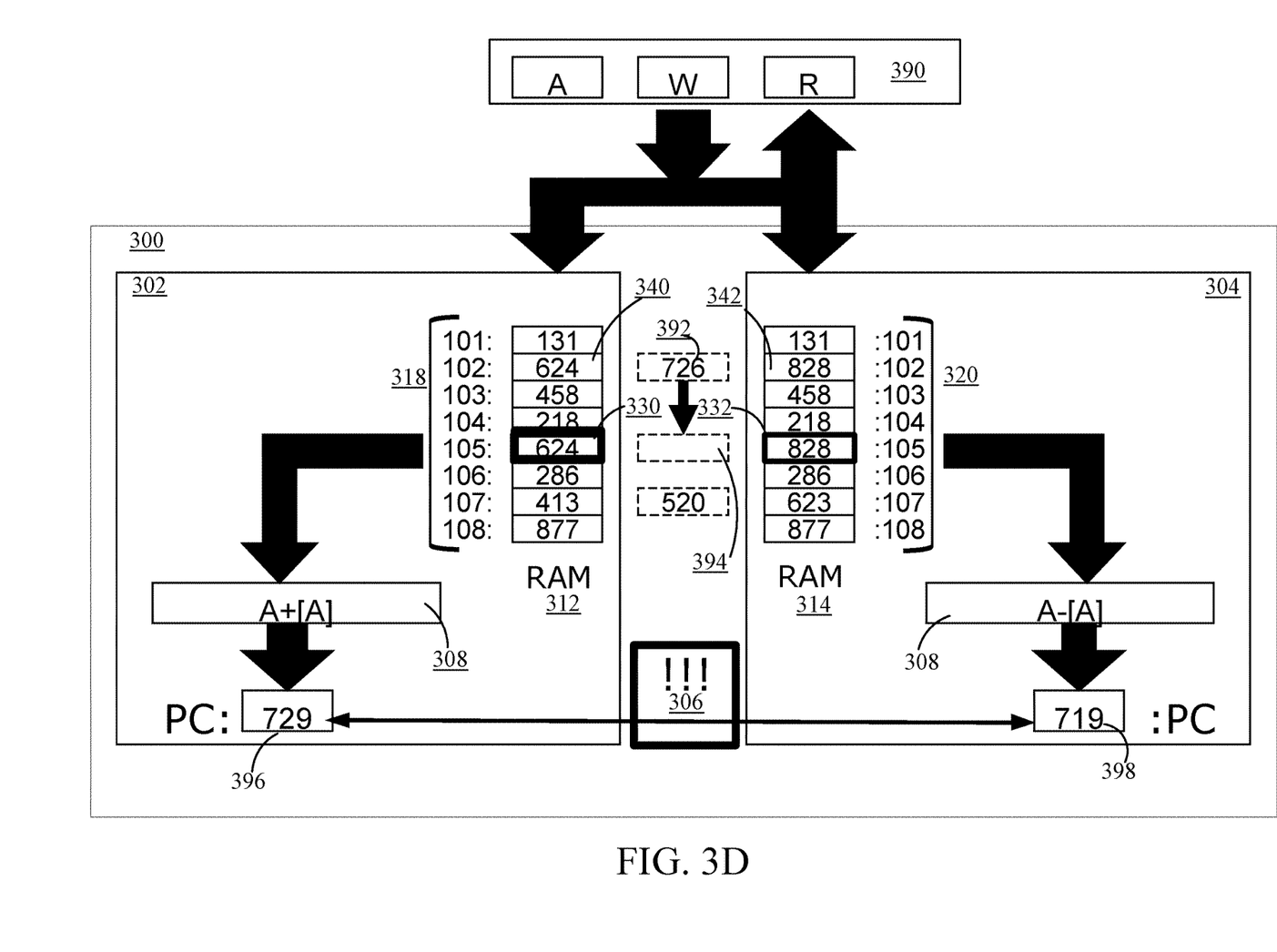
FIG. 3D is schematic diagram of the dual lock step processor system of FIG. 3A executing a copy memory command by an unauthorized entity according to the inventive concepts disclosed herein.

Referring now to FIG. 3D, a schematic diagram of the dual lock step processor system of FIG. 3A executing a copy memory command by an unauthorized entity is shown, according to the inventive concepts disclosed herein. In the dual lock step processor system 300 shown in FIG. 3C, an unauthorized entity has gained control of the program counters in memory and the ability to copy them. The unauthorized entity identifies some other program counter that has already been stored in memory at some different location 392 in the memory stack of each respective processor. Due to the configuration of the dual lock step processor system 300, the unauthorized entity is able to move the encoded program counter 340 at the address location (102) on the first memory stack 318 and the encoded program counter 342 at the address location (102) on the second memory stack 320 to the respective location (105) on each stack. In other words, the encoded value 340 of (624) at address location (102) on the first memory stack 318 is copied and inserted as an encoded value 330 of (624) at address location (105) on the first memory stack 318. The encoded value 342 of (828) at address location (102) on the second memory stack 320 is copied and inserted as an encoded value 332 of (828) at address location (105) on the second memory stack 320.

When the copied encoded values are retrieved from address location (105), the resulting decoded values will not match, thereby triggering the exploit monitor 306. Specifically, the first encoded program counter value 330 of (624) is retrieved from the address location (105) on the first processor 302 and differentially decoded to generate a first decoded program counter value 396 of (729). In parallel, the second encoded program counter value 332 of (828) is retrieved from the address location (105) on the second processor 304 and differentially decoded to generate a second decoded program counter value 398 of (719). The first decoded program counter value 396 of (729) does not match the second decoded program counter value 398 of (719) triggering the exploit monitor 306. As is readily apparent, because the differential encoding is address location dependent, or in some embodiments, asymmetric, copying encoded program counters from address location to another address location on a memory stack will result in different decoded program counter values.

Figure 4:
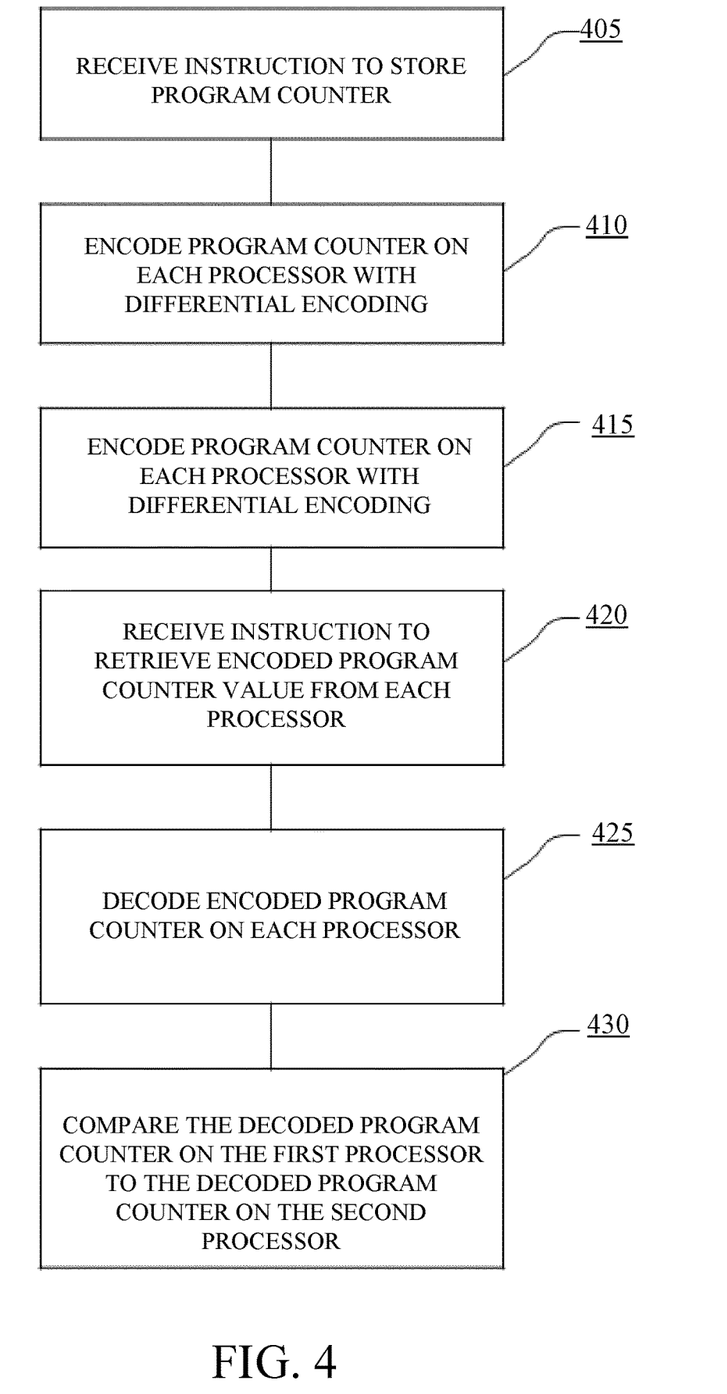
FIG. 4 is a flow chart of an exemplary embodiment of a method for encoding and decoding program counters in a dual lock step processor according to the inventive concepts disclosed herein.

Referring now to FIG. 4, a flow diagram of a method 400 for writing and accessing program critical values (e.g., program counters) in a dual lock step processor is shown according to the inventive concepts disclosed herein. The method can be performed by the systems 200, 300 described herein.

A step (405) may include receiving an input associated with a first program critical value. The input is associated with a first instruction to store a program critical value in a memory stack location. The selected address location is one of a plurality of address locations of a dedicated memory in each respective processor. In other words, the storage location is at a first address location on a first memory of the first processor and an identical second address location (e.g., at stack location "105" in the first memory and at stack location "105" in the second memory) in a second memory of the second processor. Since the dual lock step processor receives a single input, which is passed to both processors, the first processor and second processor receive the same instruction (e.g., first instruction on the first processor and second instruction on the second processor). The store instruction is executed in parallel on a first processor and a second processor.

A step (410) may include encoding the program critical value on the first processor and the second processor. On the first processor, a compiler system is configured to encode the program critical value using a first differential encoding to generate a first encoded program counter value. In parallel, on the second processor, a compiler system is configured to encode the program critical value using a second differential encoding to generate a second encoded program critical value. The process by which the compiler system manipulates one or more program counters in the first processor is different from, and asymmetric to (e.g., not the same), the compiler system's manipulation of the identical program counter in the second processor. For example, the first encoded program critical value can be generated by subtracting the address location on the stack (e.g., where the value is to be stored) from twice the value of the program critical value; conversely, the second encoded program critical value can be generated by adding the address location on the stack and twice the value of the program counter.

A step (415) may include writing the first encoded program critical value into the first address location of the first memory of the first processor and writing the second encoded program critical value into the second address location of the second memory of the second processor. As stated above, if there is no tampering or unauthorized code being executed (e.g., an unauthorized entity has not inserted unauthorized code) then the first address location on the first memory stack will be identical to the analogous location of the second address location on the second memory stack.

A step (420) may include, subsequent to writing the first and second encoded program critical values to memory, receiving an instruction to retrieve a stored value stored in a selected address location. The selected address location is the same location that the first encoded program critical value and the second encoded program critical value were stored at step (415). Since the dual lock step processor receives a single input, which is passed to both processors, the first processor and second processor receive the same instruction (e.g., third instruction on the first processor and fourth instruction on the second processor). The retrieve instruction is executed in parallel on a first processor and a second processor. For example, a first stored value (e.g., encoded program critical value) from the selected address location on the first processor can be retrieved and a second stored value from the identical selected address location on the second processor can be retrieved.

A step (425) may include decoding the encoded program critical values retrieved from the memory location on the first processor and the second processor. On the first processor, a compiler system is configured to decode the encoded program critical value using a first differential encoding to generate a first decoded program critical value (e.g., stored value). In parallel, on the second processor, a compiler system is configured to decode the encoded program critical value using the second differential encoding to generate a second decoded program critical value. As will be appreciated, decoding the values is the opposite of the manipulation done when encoding the value at step (410). For example, the first decoded program critical value is generated by adding the address location on the stack (e.g., where the value is retrieved from) from half the value of the retrieved first stored value; conversely, the second decoded program critical value is generated by subtracting the address location on the stack from half the value of the second stored value.

A step (430) may include comparing the first decoded value on the first processor and the second decoded value on the second processor. The comparison may be done by an exploit monitor operably connected to the first processer and the second processor. If the first decoded value matches the second decoded value, the code has not been manipulated and operation continues with the dual lock step processor outputting the program counter. As will be appreciated, the first decoded value and the second decoded value are identical to each other and are identical to the original, unmanipulated program counter at step (405). If the first decoded stored value is different from the second decoded stored value, manipulation of the code has occurred and the exploit monitor may halt operation (e.g., signal an issue) of the dual lock step processor system and/or some operations of the avionics system.

As will be appreciated from the above, systems and methods for a dual lock step processor system according to embodiments of the inventive concepts disclosed herein may improve cyber security of aircraft and other platforms by ensuring that arbitrary code execution is impossible and that any vulnerability in the operating system of the aircraft and other platforms that allows for an unauthorized party to read arbitrary memory and/or to write arbitrary memory would be detected and signaled by the dual lock step processor system. Due to the configuration of the dual lock step processor system of receiving a single input, an unauthorized entity can only insert code that is the same, as it is impossible for different code to be inserted on different processors. Accordingly, the program that is loaded onto the computer is the only code that will be able to execute in that environment, thereby preventing outside code from being executed and/or outside access by an unauthorized party.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A dual lock step processor system, comprising:
a first processor operably connected to a first memory, the first memory comprising a plurality of first address locations;
the first processor configured to:
receive, from the first memory, a first instruction to store a first program value;
differentially encode the first program value using a first differential encoding to generate a first differentially encoded program value; and
write the first differentially encoded program value into a first selected address location of the plurality of first address locations; and
a second processor operably connected to a second memory, the second memory comprising a plurality of second address locations, each second address location of the plurality of second address locations corresponding to an identical first address location of the plurality of first address locations;
the second processor configured to:
receive, from the second memory, a second instruction to store the first program value;
differentially encode the first program value using a second differential encoding to generate a second differentially encoded program value; and
write the second differentially encoded program value into a second selected address location of the plurality of second address locations corresponding to the first selected address location;
wherein the first processor is further configured to:
receive, from the second memory and subsequent to writing the first differentially encoded program value into the first selected address location, a third instruction to retrieve a first stored value stored in the first selected address location;
retrieve the first stored value from the first selected address location; and
differentially decode the first stored value using the first differential encoding to generate a first differentially decoded stored value; and
wherein the second processor is further configured to:
receive, from the second memory and subsequent to writing the second differentially encoded program value into the second selected address location, a fourth instruction to retrieve a second stored value stored in the second selected address location; and
differentially decode the second stored value using the second differential encoding to generate a second differentially decoded stored value; and
an exploit monitor operably connected to the first processor and the second processor, the exploit monitor configured to:
compare the first differentially decoded stored value to the second differentially decoded stored value; and
responsive to the first differentially decoded stored value being different from the second differentially decoded stored value, interrupt operation of the first processor by generating a first interrupt signal to the first processor, and interrupt operation of the second processor by generating a second interrupt signal to the second processor,
wherein the first differential encoding is a summation encoding to generate the first differentially encoded program value and a subtraction decoding to generate the first differentially decoded stored value,
wherein the summation encoding is a sum of the first program value and the first selected address location, and the subtraction decoding is a subtraction of the first program value and the first selected address location,
wherein the second differential encoding is a subtraction encoding to generate the second differentially encoded program value and a summation decoding to generate the second differentially decoded stored value,
wherein the subtraction encoding is a subtraction of the first program value and the second selected address location, and the summation decoding is a summation of the first program value and the second selected address location.

2. The dual lock step processor system of claim 1, wherein the exploit monitor is further configured to allow operation of the first processor or the second processor responsive to the first differentially decoded stored value being equal to the second differentially decoded stored value, wherein allowing the operation includes:
the first processor receiving from the first memory, a third instruction to store a second program value; and
the second processor receiving from the second memory, a fourth instruction to store the second program value.

3. The dual lock step processor system of claim 1, wherein prior to receiving the first instruction by the first processor and second instruction by the second processor, the dual lock step processor system receives a single input, the single input associated with the first instruction and the second instruction.

4. The dual lock step processor system of claim 1, wherein first processor is further configured to:
receive, from the first memory, a fifth instruction to store a second program value; and
write the second program value into a third selected address location of the plurality of first address locations; and
wherein second processor is further configured to:
receive, from the second memory, a sixth instruction to store the second program value; and
write the second program value into a fourth selected address location of the plurality of second address locations.

5. The dual lock step processor system of claim 4, wherein the exploit monitor is further configured to interrupt operation the first processor and the second processor responsive to the fifth instruction received by the first processor being different from the sixth instruction received by the second processor.

6. The dual lock step processor system of claim 1, wherein the first differential encoding is associated with the first selected address location and the second differential encoding is asymmetrically associated with the first selected address location.

7. The dual lock step processor system of claim 1, wherein the plurality of first address locations is on a first stack of the first memory and wherein the plurality of second address locations is on a second stack of the second memory.

8. A method, comprising:
receiving an input associated with a first program value;
receiving a first instruction to store the first program value;
differentially encoding the first program value using a first differential encoding to generate a first differentially encoded program value on a first processor;

writing the first differentially encoded program value into a first selected address location, the first selected address location being one of a plurality of first address locations of a first memory, the first processor operably connected to the first memory;

receiving a second instruction to store the first program value;

differentially encoding the first program value using a second differential encoding to generate a second differentially encoded program value on a second processor; and writing the second differentially encoded program value into a second selected address location, the second selected address location being one of a plurality of second address locations of a second memory, wherein the second selected address location in the plurality of second address locations corresponds to an analogous location of the first selected address location in the plurality of first address locations, and wherein the second processor is operably connected to the second memory, receiving, from the first memory and subsequent to writing the first differentially encoded program value into the first selected address location, a third instruction to retrieve a first stored value stored in the first selected address location;

retrieving the first stored value from the first selected address location;

differentially decoding the first stored value using the first differential encoding to generate a first differentially decoded stored value;

receiving, from the second memory and subsequent to writing the second differentially encoded program value into the second selected address location, a fourth instruction to retrieve a second stored value stored in the second selected address location;

differentially decoding the second stored value using the second differential encoding to generate a second differentially decoded stored value;

comparing the first differentially decoded stored value to the second differentially decoded stored value on an exploit monitor operably connected to the first processor and the second processor; and responsive to the first differentially decoded stored value being different from the second differentially decoded stored value, interrupt operation of the first processor by generating a first interrupt signal to the first processor, and interrupt operation of the second processor by generating a second interrupt signal to the second processor, wherein the first differential encoding is a summation encoding to generate the first differentially encoded program value and a subtraction decoding to generate the first differentially decoded stored value, wherein the summation encoding is a sum of the first program value and the first selected address location, and the subtraction decoding is a subtraction of the first program value and the first selected address location, wherein the second differential encoding is a subtraction encoding to generate the second differentially encoded program value and a summation decoding to generate the second differentially decoded stored value, wherein the subtraction encoding is a subtraction of the first program value and the second selected address location, and the summation decoding is a summation of the first program value and the second selected address location.

9. The method of claim 8, further comprising:

receiving, from the first memory, a fifth instruction to store a second program value; and writing the second program value into a third selected address location of the plurality of first address locations;

receiving, from the second memory, a sixth instruction to store the second program value; and writing the second program value into a fourth selected address location of the plurality of second address locations.

* * * * *